(12) United States Patent
Scofield (10) Patent No.: US 10,076,886 B2
(45) Date of Patent: Sep. 18, 2018

(54) FOOTWEAR HAVING MOLDED PORTION(S)

(71) Applicant: Chinook Asia LLC, Lake Oswego, OR (US)

(72) Inventor: Robert Kent Scofield, Lake Oswego, OR (US)

(73) Assignee: Chinook Asia LLC, Lake Oswego, OR (US)

( * ) Notice: Subject to any disclaimer, the term of this patent is extended or adjusted under 35 U.S.C. 154(b) by 332 days.

(21) Appl. No.: 15/003,073

(22) Filed: Jan. 21, 2016

(65) Prior Publication Data

US 2016/0207270 A1 Jul. 21, 2016

Related U.S. Application Data (60) Provisional application No. 62/105,843, filed on Jan. 21, 2015.

(51) Int. Cl.
*B29D 35/00* (2010.01)
*A43B 23/02* (2006.01)
*B29D 35/12* (2010.01)

(52) U.S. Cl.
CPC ...... *B29D 35/0009* (2013.01); *A43B 23/0215* (2013.01); *B29D 35/0027* (2013.01); *B29D 35/126* (2013.01)

(58) Field of Classification Search
CPC ............ B29D 35/0009; B29D 35/0027; B29D 35/126; A43B 23/0215
See application file for complete search history.

(56) References Cited

U.S. PATENT DOCUMENTS 2,484,877 A 10/1949 Dodge
2,800,729 A 7/1957 Abel et al.
(Continued)

FOREIGN PATENT DOCUMENTS

CA 1151365 A1 8/1983
CA 2755330 A1 12/2011
(Continued)

OTHER PUBLICATIONS

Mar. 29, 2016, International Search Report of the International Searching Authority from the U.S. Receiving Office, in PCTUS2016014272, which is the international application to this U.S. application.

(Continued)

*Primary Examiner* — Robert B Davis
(74) *Attorney, Agent, or Firm* — Kolisch Hartwell, P.C.

(57) ABSTRACT

Methods of and molds for manufacturing footwear are disclosed. In one example, the method may include forming at least one molded portion adjacent to at least one non-molded portion such that part of the at least one molded portion overlaps and contacts the at least one non-molded portion, and forming the at least one molded portion to include end portions that are adjacent the part of the at least one molded portion and that extend away from the at least one non-molded portion such that the end portions do not contact the at least one non-molded portion; moving the end portions of the at least one molded portion toward the at least one non-molded portion such that the end portions contact the at least one non-molded portion; and securing the end portions of the at least one molded portion to the at least one non-molded portion.

20 Claims, 5 Drawing Sheets

(56) References Cited

U.S. PATENT DOCUMENTS

| | | | |
|---|---|---|---|
| 3,500,502 A | * | 3/1970 | Santelmann ....... B29D 35/0018 425/119 |
| 3,541,646 A | * | 11/1970 | Baudou .................... A43B 5/04 425/119 |
| 3,684,417 A | * | 8/1972 | Baudou .................. B29C 33/00 12/4.1 |
| 3,718,726 A | | 2/1973 | Taylor |
| 3,806,974 A | | 4/1974 | Di Paolo |
| 3,838,956 A | | 10/1974 | Schmidt |
| 4,034,431 A | | 7/1977 | Fukuoka |
| 4,266,750 A | | 5/1981 | Gallizia |
| 4,333,193 A | | 6/1982 | Bartneck |
| 5,647,150 A | | 7/1997 | Romanato et al. |
| 6,464,907 B2 | | 10/2002 | Gross |
| 8,361,369 B1 | | 1/2013 | Cook et al. |
| 9,421,726 B2 | | 8/2016 | Scofield |
| 2004/0020077 A1 | | 2/2004 | Thomas et al. |
| 2013/0133229 A1 | | 5/2013 | Ludemann et al. |
| 2013/0239439 A1 | | 9/2013 | Ludemann et al. |

FOREIGN PATENT DOCUMENTS

| | | |
|---|---|---|
| EP | 0091536 A2 | 10/1983 |
| FR | 2067190 A1 | 8/1971 |
| GB | 2146282 A | 4/1985 |

OTHER PUBLICATIONS

Mar. 29, 2016, Written Opinion of the International Searching Authority from the U.S. Receiving Office, in PCTUS2016014272, which is the international application to this U.S. application.

Feb. 23, 2015, Office action from the U.S. Patent and Trademark Office in U.S. Appl. No. 13/838,382, which is another application of Applicant Chinook Asia LLC.

* cited by examiner

FOOTWEAR HAVING MOLDED PORTION(S)

CROSS-REFERENCE TO RELATED APPLICATIONS

This application claims the benefit of U.S. Provisional Patent Application Ser. No. 62/105,843, filed on Jan. 21, 2015 and entitled "Methods of Manufacturing Footwear Having Direct Injection Molded Portion(s)." The complete disclosure of the above application is hereby incorporated for reference for all purposes.

INTRODUCTION

Boots, athletic shoes, and other types of footwear may include one or more molded portions. The molded portion(s) may be attached to other components of the footwear via molding, such as direct injection molding, in which non-molded portion(s) of the footwear are held in position in the mold and the molded portions are created and directly attached to the non-molded portion(s). However, molding may lead to flashing (flash) or burrs, which are excess material that exceed normal part geometry in the molded portion(s). Flashing may particularly be an issue when the non-molded portion(s) are made of synthetic and/or leather materials.

SUMMARY

Disclosed herein are examples of methods, apparatuses, and systems that may address the above mentioned problems, among others.

In one example, methods of manufacturing footwear are disclosed. The method may include forming at least one molded portion of the footwear adjacent to at least one non-molded portion of the footwear such that part of the at least one molded portion overlaps and contacts the at least one non-molded portion. Forming the at least one molded portion may include forming the at least one molded portion to include end portions that are adjacent the part of the at least one molded portion and that extend away from the at least one non-molded portion such that the end portions do not contact the at least one non-molded portion. The method may additionally include moving the end portions of the at least one molded portion toward the at least one non-molded portion such that the end portions contact the at least one non-molded portion. The method may further include securing the end portions of the at least one molded portion to the at least one non-molded portion.

In another example, molds for manufacturing footwear are disclosed. The mold may include a plurality of walls defining a mold cavity. The mold cavity may be sized to receive a last with at least one non-molded portion secured to the last. When the last with the at least one non-molded portion is received in the mold cavity, a plurality of first channels may be defined between the at least one non-molded portion and one or more walls of the plurality of walls. The mold may additionally include one or more end channels in at least one wall of the plurality of walls. The one or more end channels may be in fluid communication with one or more first channels of the plurality of first channels.

When the last with the at least one non-molded portion secured to the last is received in the mold cavity, the plurality of first channels may be configured to receive moldable material to form a first part of at least one molded portion that contacts the at least one non-molded portion, and the one or more end channels are configured to receive moldable material to form a second part of the at least one molded portion. The second part may include one or more end portions that extend away from and do not contact the at least one non-molded portion.

In a further example, methods of manufacturing footwear are disclosed. The method may include securing at least one non-molded portion to a last, and inserting the last with the secured at least one non-molded portion into a mold having a plurality of walls that define a mold cavity such that the at least one non-molded portion extends into the mold cavity. The mold cavity may be sized such that, when the last is inserted into the mold, a plurality of first channels are defined between the at least one non-molded portion and one or more walls of the plurality of walls. The mold may further include one or more end channels in at least one wall of the plurality of walls. The one or more end channels may be in fluid communication with one or more first channels of the plurality of first channels.

The method may additionally include feeding moldable material into the plurality of first channels and one or more end channels, and curing the moldable material in the plurality of first channels and the one or more end channels to form at least one molded portion having one or more ends that extend away and do not contact the at least one non-molded portion. The method may further include removing the at least one non-molded portion and the at least one molded portion from the mold, and moving the one or more ends of the at least one molded portion toward the at least one non-molded portion such that the one or more ends contact the at least one non-molded portion. The method may additionally include securing the one or more ends of the at least one molded portion to the at least one non-molded portion.

Features, functions, and advantages may be achieved independently in various embodiments of the present disclosure, or may be combined in yet other embodiments, further details of which can be seen with reference to the following description and drawings.

DETAILED DESCRIPTION OF THE DISCLOSURE

Overview

Various embodiments of mold methods and molds that may be used with those methods are described below and illustrated in the associated drawings. Unless otherwise specified, an embodiment and/or its various components may contain at least one of the structure, components, functionality, and/or variations described and/or illustrated herein. Furthermore, the structures, components, functionalities, and/or variations described and/or illustrated herein in connection with the present teachings may be included in other embodiments. The following description of various embodiments is merely illustrative in nature and is in no way intended to limit the disclosure, its application, or uses. Additionally, the advantages provided by the embodiments, as described below, are illustrative in nature and not all embodiments provide the same advantages or the same degree of advantages.

Disclosed herein are molding methods and molds that may be used with those methods. In some embodiments, the molding methods may include securing non-molded portion(s) of the footwear in a mold, feeding the moldable material(s) into a mold cavity of the mold, curing the moldable material(s) in the mold cavity to form molded portion(s), removing the non-molded and molded portions from the mold cavity, and attaching the end(s) of the molded portion(s) to the non-molded portion(s).

In some embodiments, the molds may include a receiving area and a mold cavity. The receiving area may be configured to secure non-molded portion(s) (including lasted non-molded portion(s)) in the mold. The mold cavity may include proximal portion(s) and distal portion(s). The proximal portion(s) may be adjacent to and generally parallel to the receiving area, while the distal portion(s) may be spaced (and/or extending away) from the receiving area relative to the proximal portion(s).

EXAMPLES, COMPONENTS, AND ALTERNATIVES

The following examples describe selected aspects of exemplary embodiments as well as related systems and/or methods. These examples are intended for illustration and should not be interpreted as limiting the entire scope of the present disclosure. Each example may include one or more distinct inventions, and/or contextual or related information, function, and/or structure.

Example 1

Figure 1:
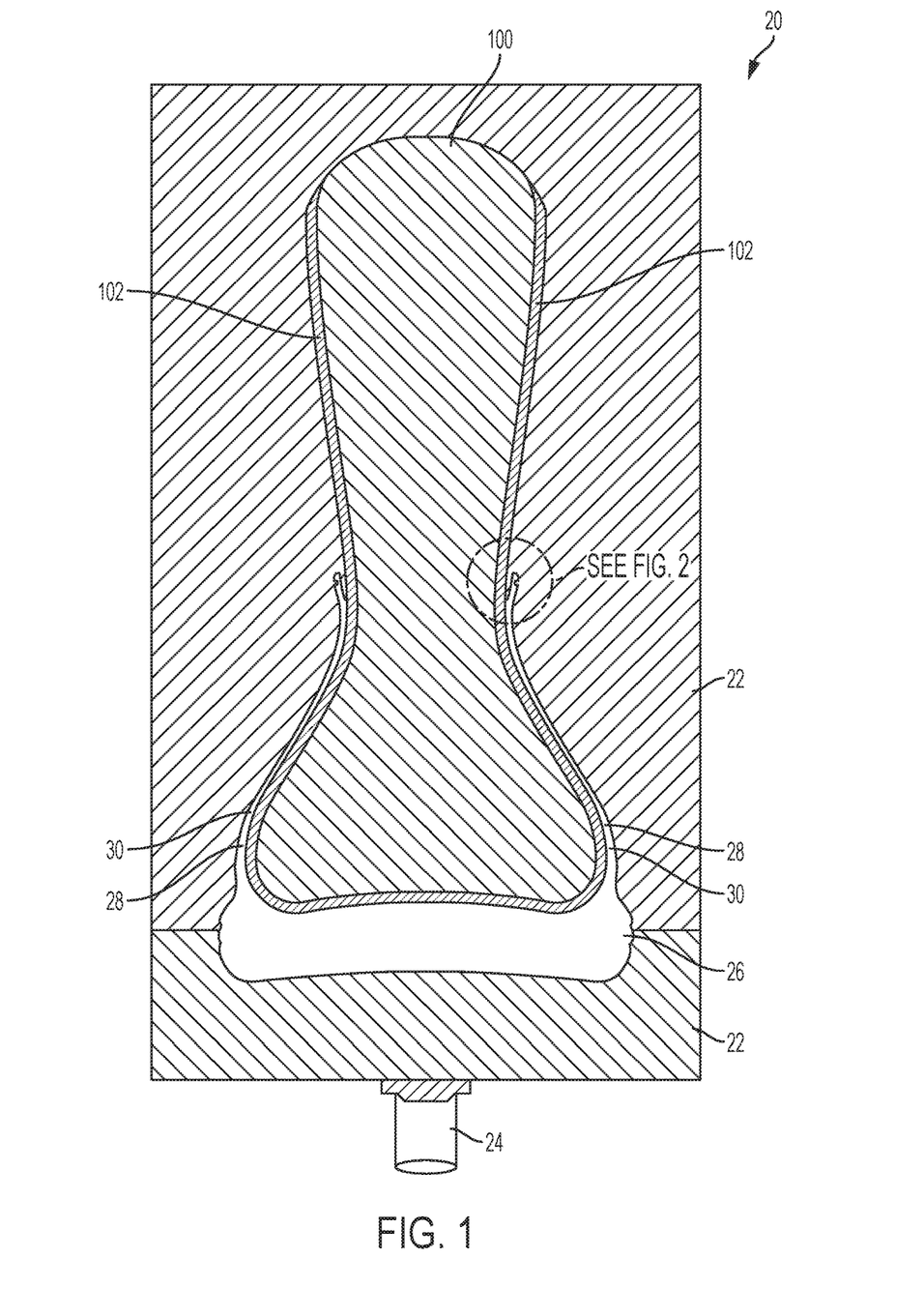
FIG. 1 is a sectional view of a mold according to the present disclosure.
Figure 2:
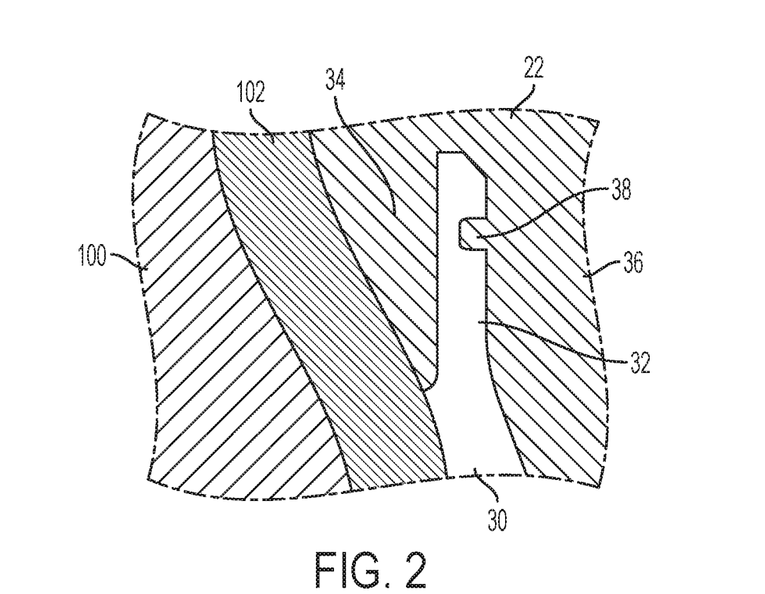
FIG. 2 is a partial view of the mold of FIG. 1 according to the present disclosure.
Figure 5:
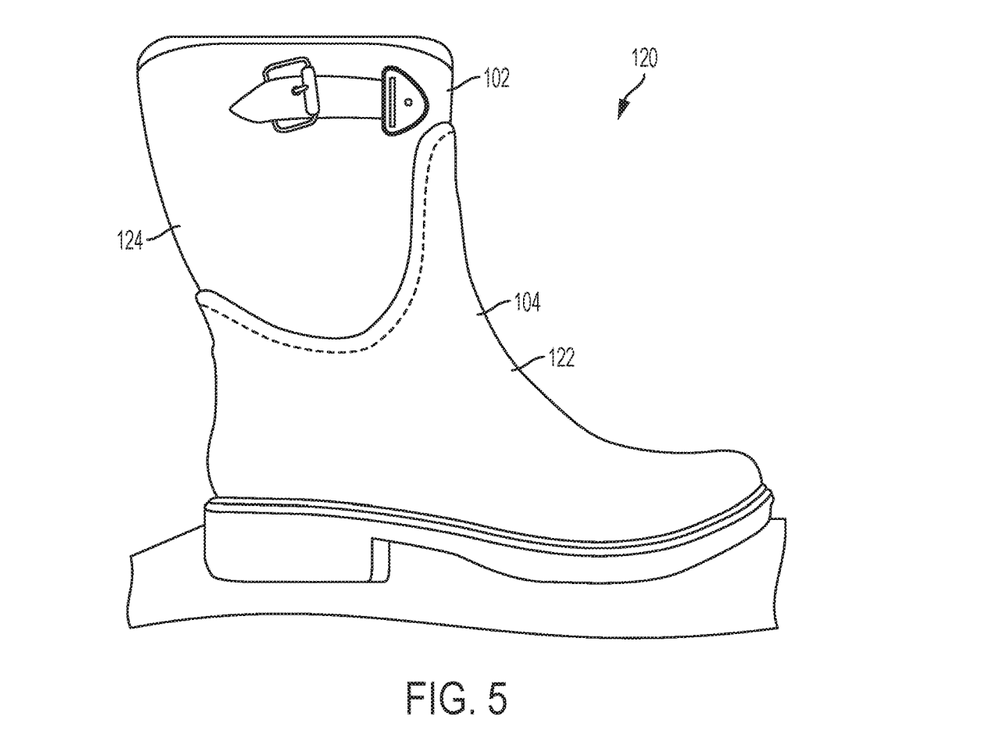
FIG. 5 is an example of footwear having molded portions according to the present disclosure.

FIG. 1-2 show an example of a mold 20 that may be used to manufacture footwear, such as footwear 120 in FIG. 5. Mold 20 may include a plurality of walls 22 and at least one conduit 24. Two or more of walls 22 may define a mold cavity 26, which may be fluidly connected (or in fluid communication with) conduit(s) 24. The mold cavity may have any suitable size configured to manufacture molded portion(s) of the footwear. For example, the mold cavity may be sized to receive a foot form or last 100, which may or may not include non-molded portion(s) 102 secured to the last, and/or form channels as further discussed below. Non-molded portion(s) 102 and molded portion(s) 104 may include any suitable portions of the footwear being manufactured, such as a footwear upper (or part of the footwear upper) and/or the sole (or part of the sole). For example, as shown in FIG. 5, non-molded portion 102 may include a first portion of a footwear upper, while molded portion(s) 104 may include a second portion of the footwear upper and/or the sole. Mold cavity 26 may sometimes be referred to as being configured to receive lasted non-molded portion(s) 102.

Figure 3:
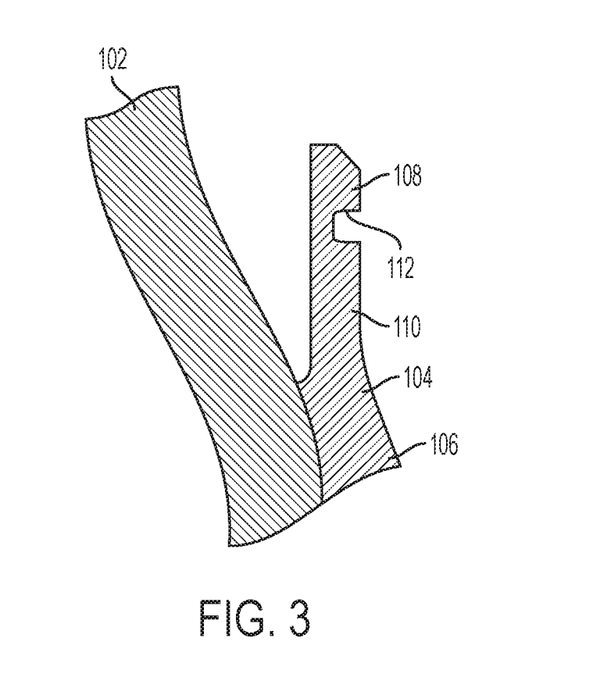
FIG. 3 is a partial sectional view of the footwear produced in the mold of FIGS. 1-2 according to the present disclosure.

When last 100 with non-molded portion(s) 102 is received in mold cavity 26, a plurality of channels 28 may be defined between any suitable walls 22 and non-molded portion(s) 102 (and/or last 100). For example, a plurality of first channels 30 may be defined between non-molded portion(s) 102 and one or more of walls 22 when last 100 with non-molded portion(s) 102 is received in the mold cavity. First channels 30 may be adjacent to non-molded portion(s) 102 such that, for example, molded portion(s) 104 that are formed in first channels 30 (which may be referred to as a first part 106 of molded portion(s) 104 as shown in FIG. 3) overlap and/or contact non-molded portion(s) 102. First channels 30 may be configured to receive moldable material(s) to form molded portion(s) 104, such as through conduit(s) 24. The first channels may sometimes be referred to as the "proximal portions" of the mold or mold cavity.

One or more of walls 22 may include one or more end channels 32. The end channels may be formed in the wall(s). In other words, the end channels are not defined between non-molded portion(s) 102 and wall(s) 22, such as when lasted non-molded portion(s) 102 are received in the mold cavity. Instead, end channel(s) 32 may be defined between a first portion 34 of a wall 22 and a second portion 36 of the wall, as shown in FIG. 2. End channel(s) 32 may be fluidly connected to (or in fluid communication with) first channel(s) 30 when last 100 with non-molded portion(s) 102 is received in the mold cavity. In other words, moldable material(s) fed into mold cavity 26 may flow from first channel(s) 30 to end channel(s) 32. The end channels may sometimes be referred to as the "distal portions" of the mold or mold cavity.

End channel(s) 32 may extend away from the mold cavity such that end portions 110 that are formed in end channel(s) (which may be referred to as a second part 108 of molded portion(s) 104) do not overlap and/or do not contact non-molded portion(s) 102, as shown in FIG. 3. In other words, when the last and the non-molded portion(s) are received in the mold cavity, the end channel(s) may extend away from the non-molded portion(s) and not overlap the non-molded portion(s). The end channel(s) may be in any suitable portion(s) of the mold. Although end channel(s) 32 are shown at a central or intermediate portion of the mold, the end channels may additionally, or alternatively, be located in the upper and/or lower portions of the mold. For example, end channel(s) 32 may be located between the portion of the mold cavity for the footwear upper and the portion of the mold cavity for the sole to form end portions that may, for example, be secured to the sole of the footwear.

The end channel(s) may be any suitable dimensions, such as between about 4 millimeters to about 7 millimeters long and may be spaced apart from the non-molded portion(s) (when received in the mold cavity) by about 2 millimeters to about 5 millimeters. In some examples, the end channel(s) may deviate from the non-molded portion(s) and/or first channels by about 25 degrees to about 35 degrees. In some examples, the width of the end channels may be smaller than the width of the first channels.

Figure 4:
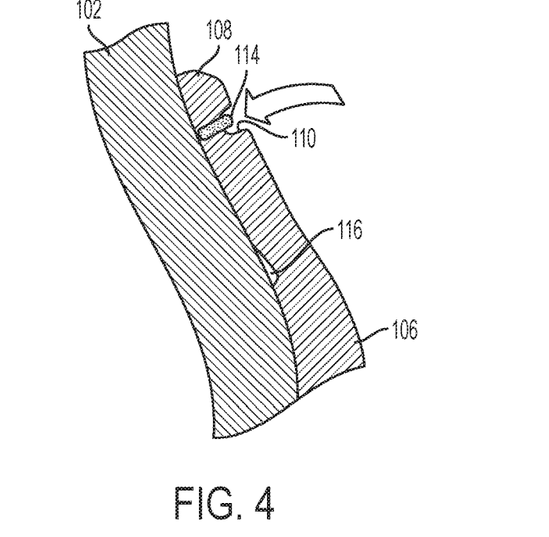
FIG. 4 is the partial sectional view of FIG. 3, showing securing of an end of a molded portion to a non-molded portion according to the present disclosure.

End channel(s) 32 may be any suitable shape(s). For example, the end channels may be elongate and may include any suitable rectilinear and/or curvilinear shape(s). Additionally, end channel(s) 32 may include at least one projection 38, such as from second portion 36. The projection may be configured and/or shaped to form at least one indentation 112 in end portion(s) 110, as shown in FIG. 3. The indentation may be sized and/or configured to receive a stitching element 114, as shown in FIG. 4. Although the projection is shown to produce a square-shaped indentation, the projection may be any suitable shape(s) to produce indentation 112 of any suitable shape(s), such as rectangular, triangular, circular, semi-circular, etc. Additionally, although end channel(s) 32 is shown to include a single projection 38, one or more end channel(s) may include two or more projections 38.

Because end portion(s) 110 extend away from the non-molded portion(s), a void 116 may be formed between part of the end portion and the non-molded portion(s), when the end portion(s) are secured to the non-molded portion(s), as shown in FIG. 4.

Although mold 20 is shown to be configured to manufacture part of the footwear upper and/or the sole, the mold may alternatively be configured to manufacture only part of the footwear upper, the entire footwear upper, only the sole, only one or more components of the sole, or any suitable combination.

An example of footwear 120 produced in mold 20 and/or via one or more of the manufacturing methods discussed below is shown in FIG. 5. Footwear 120 includes a molded upper 122 stitched, cemented, or otherwise attached (or adhered) to a non-molded shaft 124. Although footwear 120 is shown as a boot, footwear 120 may be any suitable footwear manufactured in the mold and/or according to the methods of the present disclosure.

Example 2

Figure 6:
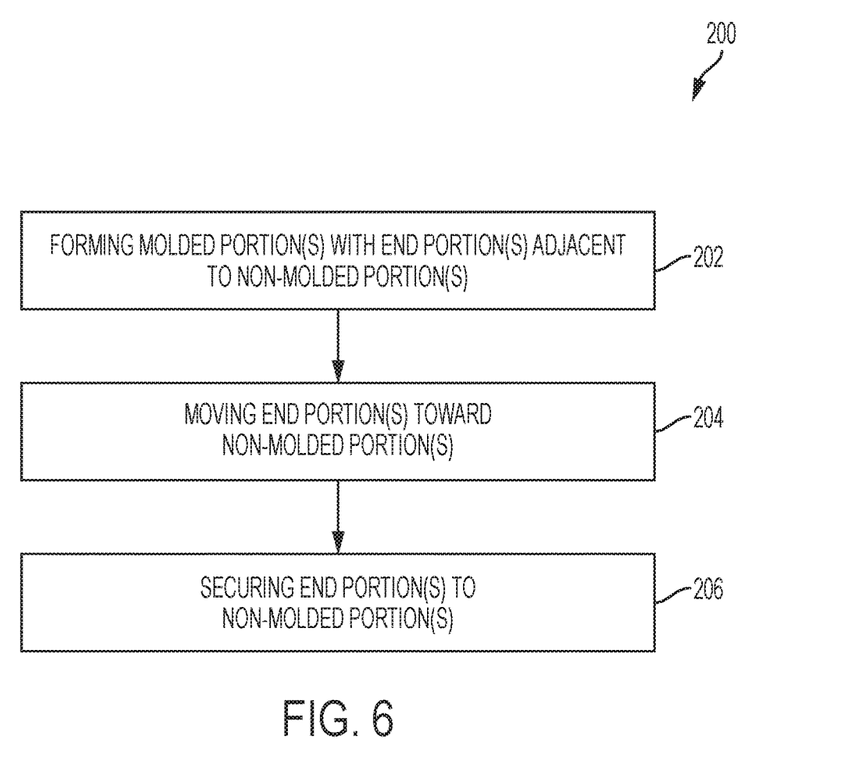
FIG. 6 is an example of a method of manufacturing footwear according to the present disclosure.

FIG. 6 shows an example of a molding method 200, which may be configured to create molded portion(s) and attach the molded portion(s) to non-molded portion(s) of the footwear. The molded portion(s) and non-molded portion(s) may be any suitable portions of the footwear, such as the shaft, the upper, and/or the sole. For example, the molded portion(s) may be a first molded portion of the footwear upper and/or the sole, and the non-molded portion may be a second non-molded portion of the footwear upper. When boots are manufactured according to method 200, the non-molded portion may be the boot shaft and the molded portion(s) may be the upper (or the vamp) and/or the sole.

At 202, molded portion(s) with end portion(s) may be formed adjacent to non-molded portions. For example, part of the molded portion(s) may be formed such that the part overlaps and contact the non-molded portion(s) or part of the non-molded portion(s). Additionally, end portion(s) may be formed that extend away from the non-molded portion(s) such that the end portion(s) do not contact the non-molded portion(s), such as when the molded portion(s) with end portion(s) are formed. The end portion(s) formed may be elongate and/or may include one or more indentations. The molded portions may be formed, for example, in a mold by feeding moldable materials into the mold, curing the moldable materials, and/or removing the cured moldable materials from the mold.

At 204, the end portion(s) may be moved toward the non-molded portion(s) such that, for example, the end portion(s) (or part of the end portion(s)) contact the at least one non-molded portion.

At 206, the end portion(s) may be secured to the non-molded portion(s). For example, the end portion(s) may be adhered to the non-molded portion(s) via cement and/or other suitable adhesive. Alternatively, or additionally, the end portion(s) may be secured via stitching. When the end portion(s) include indentation(s), the stitching element may be received in the indentation(s).

Although method 200 is shown to recite particular steps, other examples of method 200 may add, omit, repeat, modify, and/or replace one or more steps. Additionally, although the steps of method 200 have been described above in a particular order, the steps of method 200 may be completed in any suitable order.

Example 3

Figure 7:
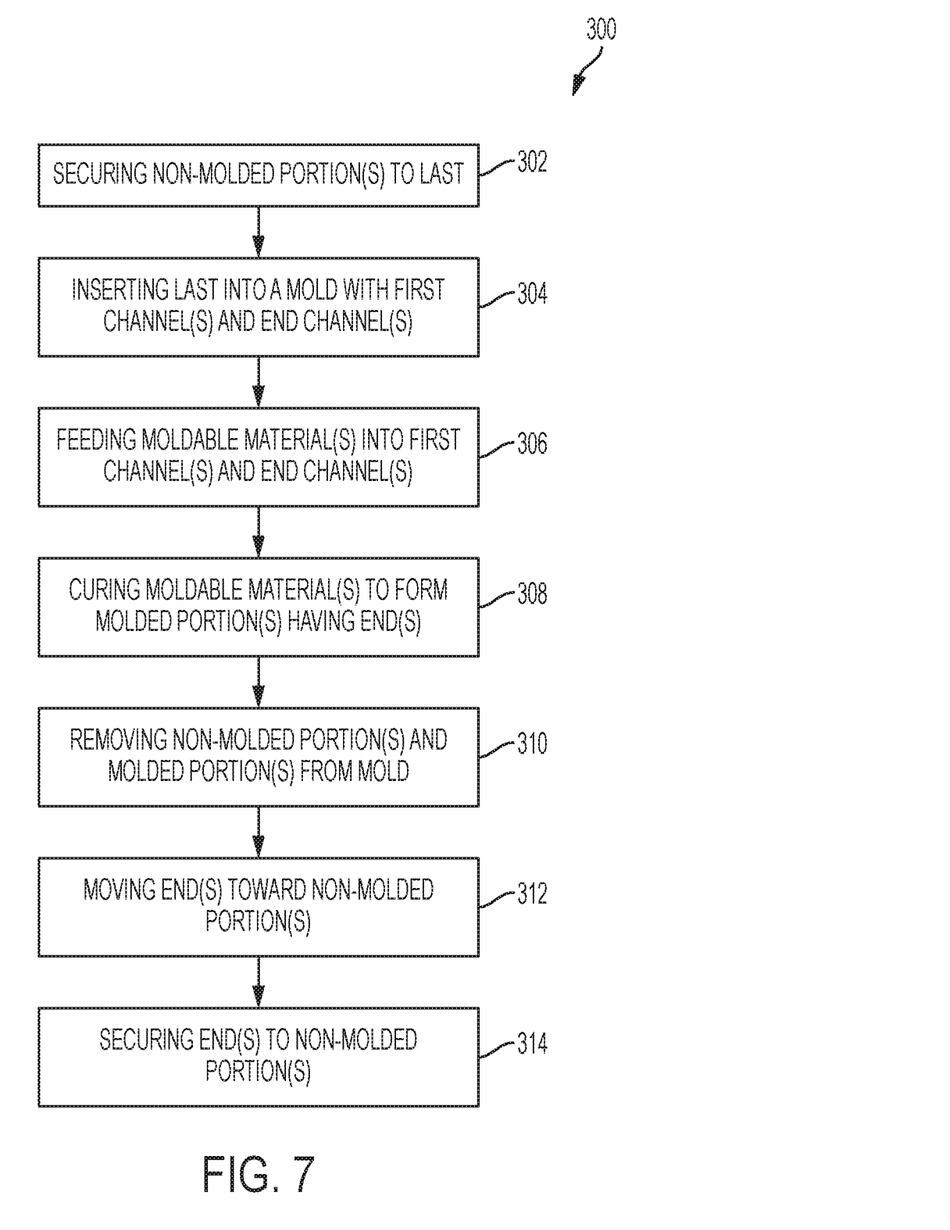
FIG. 7 is another example of a method of manufacturing footwear according to the present disclosure.

FIG. 7 shows an example of a molding method 300, which may be configured to create molded portion(s) and attach the molded portion(s) to non-molded portion(s) of the footwear. The molded portion(s) and non-molded portion(s) may be any suitable portions of the footwear, such as the shaft, the upper, and/or the sole. For example, the molded portion(s) may be a first molded portion of the footwear upper and/or the sole, and the non-molded portion may be a second non-molded portion of the footwear upper. When boots are manufactured according to method 300, the non-molded portion may be the boot shaft and the molded portion(s) may be the upper (or the vamp) and/or the sole.

At 302, the non-molded portion(s) may be secured to a foot form or last. At 304, the last with the secured non-molded portion(s) may be inserted into a mold. Specifically, the last may be inserted into the mold cavity. The mold may, for example, be configured as described above in Example 1. The last and/or non-molded portion(s) may be secured in the mold cavity via any suitable fasteners that may be incorporated with and/or independent from the mold.

At 306, moldable material(s) may be fed into the first channel(s) and end channel(s) of the mold. Any suitable materials may be used for the moldable material(s), such as various thermoplastics, thermosets, and/or elastomers. In some examples, the moldable materials may be heated and mixed prior to feeding those materials into the mold cavity.

At 308, the moldable material(s) may be cured in the first channel(s) and end channel(s) forming molded portion(s). In some examples, the moldable material(s) may be allowed to cool and harden in the mold cavity. In other examples, the moldable material(s) may be actively cooled, such as via one or more cooling devices. The part (or body) of the molded portion(s) formed in the first channel(s) of the mold cavity may become attached to the non-molded portion(s). However, the end(s) of the molded portion(s) formed in the end channel(s) may not be attached to the non-molded portion(s) because those ends are spaced from and/or extend away from the non-molded portion(s).

At 310, the non-molded and molded portions may be removed from the mold cavity with part or body of the molded portion(s) being attached to the non-molded portion(s) and the end(s) of the molded portion(s) not being attached to the non-molded portion(s).

At 312, the end(s) of the molded portion(s) may be moved toward the non-molded portion(s) at 30. For example, the end(s) may be moved to contact or touch the non-molded portion(s).

At 314, the end(s) of the molded portion(s) may be attached to the non-molded portion(s). For example, the end(s) may be adhered to the non-molded portion(s) via cement or other adhesive. Alternatively, or additionally, the end(s) of the molded portion(s) may be stitched to the non-molded portion(s). In some examples, the end(s) may include indentation(s) or groove(s) sized to receive the stitching element.

Although method 300 is shown to recite particular steps, other examples of method 300 may add, omit, repeat, modify, and/or replace one or more steps. Additionally, although the steps of method 300 have been described above in a particular order, the steps of method 300 may be completed in any suitable order.

Example 4

This section describes additional aspects and features of embodiments presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of manufacturing footwear, comprising: forming at least one molded portion of the footwear adjacent to at least one non-molded portion of the footwear such that part of the at least one molded portion overlaps and contacts the at least one non-molded portion, wherein forming the at least one molded portion includes forming the at least one molded portion to include end portions that are adjacent the part of the at least one molded portion and that extend away from the at least one non-molded portion such that the end portions do not contact the at least one non-molded portion; moving the end portions of the at least one molded portion toward the at least one non-molded portion such that the end portions contact the at least one non-molded portion; and securing the end portions of the at least one molded portion to the at least one non-molded portion.

A1. The method of paragraph A0, wherein forming the at least one molded portion to include end portions includes forming elongate end portions that extend away from the at least one non-molded portion such that the elongate end portions do not contact the at least one non-molded portion.

A2. The method of any of paragraphs A0-A1, wherein forming the at least one molded portion to include end portions includes forming the end portions with at least one indentation.

A3. The method of paragraph A2, wherein securing the end portions includes stitching the end portions to the at least one non-molded portion with a stitching element such that the stitching element is received in the at least one indentation.

A4. The method of any of paragraphs A0-A3, wherein securing the end portions includes adhering the end portions to the at least one non-molded portion via cement.

A5. The method of any of paragraphs A0-A4, wherein securing the end portions includes stitching the end portions to the at least one non-molded portion.

A6. The method of any of paragraphs A0-A5, where the end portions of the at least one molded portion includes an indentation, and wherein stitching the end portions includes stitching the end portions to the at least one non-molded portion with a stitching element such that the stitching element is received in the indentation of the end portions of the at least one molded portion.

A7. The method of any of paragraphs A0-A6, where the at least one molded portion is a first molded portion of a footwear upper and the at least one non-molded portion is a second non-molded portion of the footwear upper, wherein forming the at least one molded portion includes forming the first molded portion adjacent to the second non-molded portion such that part of the first molded portion overlaps and contacts the second non-molded portion.

A8. The method of any of paragraphs A0-A7, wherein forming the first molded portion includes forming the first molded portion to include end portions that extend away from the second non-molded portion such that the end portions do not contact the second non-molded portion.

B0. A mold for manufacturing footwear, comprising: a plurality of walls defining a mold cavity, the mold cavity is sized to receive a last with at least one non-molded portion secured to the last, wherein, when the last with the at least one non-molded portion is received in the mold cavity, a plurality of first channels are defined between the at least one non-molded portion and one or more walls of the plurality of walls; and one or more end channels in at least one wall of the plurality of walls, the one or more end channels are in fluid communication with one or more first channels of the plurality of first channels, wherein, when the last with the at least one non-molded portion secured to the last is received in the mold cavity, the plurality of first channels is configured to receive moldable material to form a first part of at least one molded portion that contacts the at least one non-molded portion, and the one or more end channels are configured to receive moldable material to form a second part of the at least one molded portion, the second part including one or more end portions that extend away from and do not contact the at least one non-molded portion.

B1. The mold of paragraph B0, wherein the one or more end channels are not defined between the at least one non-molded portion and the one or more walls when the last with the at least one non-molded portion secured to the last is received in the mold cavity.

B2. The mold of any of paragraphs B0-B1, wherein the one or more end channels are elongate.

B3. The mold of any of paragraphs B0-B2, wherein at least one end channel of the one or more end channels includes at least one projection, the at least one projection is shaped to form at least one indentation in an end portion formed in the at least one end channel.

B4. The mold of any of paragraphs B0-B3, where the at least one non-molded portion is a first portion of a footwear upper and the at least one molded portion is a second portion of the footwear upper, wherein the mold cavity is sized to receive the last with the first portion of the footwear upper secured to the last, and the plurality of first channels and the one or more end channels are configured to receive moldable material to form the second portion of the footwear upper.

C0. A method of manufacturing footwear, comprising: securing at least one non-molded portion to a last; inserting the last with the secured at least one non-molded portion into a mold having a plurality of walls that define a mold cavity such that the at least one non-molded portion extends into the mold cavity, the mold cavity is sized such that, when the last is inserted into the mold, a plurality of first channels are defined between the at least one non-molded portion and one or more walls of the plurality of walls, wherein the mold further includes one or more end channels in at least one wall of the plurality of walls, the one or more end channels are in fluid communication with one or more first channels of the plurality of first channels; feeding moldable material into the plurality of first channels and one or more end channels; curing the moldable material in the plurality of first channels and the one or more end channels to form at least one molded portion having one or more ends that extend away and do not contact the at least one non-molded portion; removing the at least one non-molded portion and the at least one molded portion from the mold; moving the one or more ends of the at least one molded portion toward the at least one non-molded portion such that the one or more ends contact the at least one non-molded portion; and securing the one or more ends of the at least one molded portion to the at least one non-molded portion.

C1. The method of paragraph C0, wherein securing the one or more ends includes adhering the one or more ends to the at least one non-molded portion via cement.

C2. The method of any of paragraphs C0-C1, wherein securing the one or more ends includes stitching the one or more ends to the at least one non-molded portion.

C3. The method of any of paragraphs C0-C2, where the one or more ends includes an indentation, wherein securing the one or more ends includes stitching the one or more ends with a stitching element such that the stitching element is received in the indentation.

C4. The method of any of paragraphs C0-C3, where the at least one non-molded portion is a first portion of a footwear upper and the at least one molded portion is a second portion of the footwear upper, wherein securing at least one non-molded portion includes securing the first portion of the footwear upper to the last.

C5. The method of paragraph C4, wherein curing the moldable material includes curing the moldable material to form the second portion of the footwear upper having one or more ends formed in the one or more end channels.

D0. A method of manufacturing footwear, comprising: securing a non-molded portion in a direct injection mold, feeding moldable materials into a mold cavity of the direct injection mold, curing the moldable materials in the mold cavity to form a molded portion, removing the non-molded and molded portions from the direct injection mold, and attaching the ends of the molded portion to the non-molded portion.

D1. The method of paragraph D0, further comprising moving ends of the molded portion toward the non-molded portion.

D2. The method of paragraph D0, wherein attaching the ends of the molded portion includes stitching the ends of the molded portion to the non-molded portion.

D3. The method of paragraph D0, wherein the non-molded portion is a shaft of the footwear.

D4. The method of paragraph D0, wherein the molded portion is an upper of the footwear.

D5. The method of paragraph D0, wherein feeding moldable materials into a mold cavity includes heating the moldable materials and mixing the moldable materials.

D6. The sole of paragraph D0, wherein curing the moldable materials includes allowing the moldable materials to cool and harden in the mold cavity.

E0. A direct injection mold, comprising: a receiving area configured to secure a non-molded portion of footwear, and a mold cavity configured to receive moldable materials, the mold cavity having proximal portions adjacent to and generally parallel to the receiving area, and distal portions spaced from and extending away from the receiving area relative to the proximal portions, wherein, when the moldable materials and the non-molded portion are in the mold, the non-molded portion contacts the moldable materials in the proximal portions but does not contact the moldable materials in the distal portions.

E1. The mold of E0, wherein the proximal portions are configured to form a body of the molded portion and the distal portions are configured to form ends of the molded portion, wherein the ends are spaced from the non-molded portion.

E2. The mold of paragraph E0, wherein the distal portions are elongate in shape and having a narrowed area shaped to create a groove in the ends of the molded portion.

Conclusion

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A method of manufacturing footwear, comprising:
   forming at least one molded portion of the footwear adjacent to at least one non-molded portion of the footwear such that part of the at least one molded portion overlaps and contacts the at least one non-molded portion, wherein forming the at least one molded portion includes forming the at least one molded portion to include end portions that are adjacent the part of the at least one molded portion and that extend away from the at least one non-molded portion such that the end portions do not contact the at least one non-molded portion;
   moving the end portions of the at least one molded portion toward the at least one non-molded portion such that the end portions contact the at least one non-molded portion; and
   securing the end portions of the at least one molded portion to the at least one non-molded portion.

2. The method of claim 1, wherein forming the at least one molded portion to include end portions includes forming elongate end portions that extend away from the at least one non-molded portion such that the elongate end portions do not contact the at least one non-molded portion.

3. The method of claim 1, wherein forming the at least one molded portion to include end portions includes forming the end portions with at least one indentation.

4. The method of claim 3, wherein securing the end portions includes stitching the end portions to the at least one non-molded portion with a stitching element such that the stitching element is received in the at least one indentation.

5. The method of claim 1, wherein securing the end portions includes adhering the end portions to the at least one non-molded portion via cement.

6. The method of claim 1, wherein securing the end portions includes stitching the end portions to the at least one non-molded portion.

7. The method of claim 6, where the end portions of the at least one molded portion includes an indentation, and wherein stitching the end portions includes stitching the end portions to the at least one non-molded portion with a stitching element such that the stitching element is received in the indentation of the end portions of the at least one molded portion.

8. The method of claim 1, where the at least one molded portion is a first molded portion of a footwear upper and the at least one non-molded portion is a second non-molded portion of the footwear upper, wherein forming the at least one molded portion includes forming the first molded portion adjacent to the second non-molded portion such that part of the first molded portion overlaps and contacts the second non-molded portion.

9. The method of claim 8, wherein forming the first molded portion includes forming the first molded portion to include end portions that extend away from the second non-molded portion such that the end portions do not contact the second non-molded portion.

10. A mold for manufacturing footwear, comprising:
a plurality of walls defining a mold cavity, the mold cavity is sized to receive a last with at least one non-molded portion secured to the last, wherein, when the last with the at least one non-molded portion is received in the mold cavity, a plurality of first channels are defined between the at least one non-molded portion and one or more walls of the plurality of walls; and
one or more end channels in at least one wall of the plurality of walls, the one or more end channels are in fluid communication with one or more first channels of the plurality of first channels, wherein, when the last with the at least one non-molded portion secured to the last is received in the mold cavity, the plurality of first channels is configured to receive moldable material to form a first part of at least one molded portion that contacts the at least one non-molded portion, and the one or more end channels are configured to receive moldable material to form a second part of the at least one molded portion, the second part including one or more end portions that extend away from and do not contact the at least one non-molded portion, wherein the one or more end channels extend completely around the last when the last with the at least one non-molded portion secured to the last is received in the mold cavity.

11. The mold of claim 10, wherein the one or more end channels are not defined between the at least one non-molded portion and the one or more walls when the last with the at least one non-molded portion secured to the last is received in the mold cavity.

12. The mold of claim 10, wherein the one or more end channels are elongate.

13. The mold of claim 10, wherein at least one end channel of the one or more end channels includes at least one projection, the at least one projection is shaped to form at least one indentation in an end portion formed in the at least one end channel.

14. The mold of claim 10, where the at least one non-molded portion is a first portion of a footwear upper and the at least one molded portion is a second portion of the footwear upper, wherein the mold cavity is sized to receive the last with the first portion of the footwear upper secured to the last, and the plurality of first channels and the one or more end channels are configured to receive moldable material to form the second portion of the footwear upper.

15. A method of manufacturing footwear, comprising:
securing at least one non-molded portion to a last;
inserting the last with the secured at least one non-molded portion into a mold having a plurality of walls that define a mold cavity such that the at least one non-molded portion extends into the mold cavity, the mold cavity is sized such that, when the last is inserted into the mold, a plurality of first channels are defined between the at least one non-molded portion and one or more walls of the plurality of walls, wherein the mold further includes one or more end channels in at least one wall of the plurality of walls, the one or more end channels are in fluid communication with one or more first channels of the plurality of first channels;
feeding moldable material into the plurality of first channels and one or more end channels;
curing the moldable material in the plurality of first channels and the one or more end channels to form at least one molded portion having one or more ends that extend away and do not contact the at least one non-molded portion;
removing the at least one non-molded portion and the at least one molded portion from the mold;
moving the one or more ends of the at least one molded portion toward the at least one non-molded portion such that the one or more ends contact the at least one non-molded portion; and
securing the one or more ends of the at least one molded portion to the at least one non-molded portion.

16. The method of claim 15, wherein securing the one or more ends includes adhering the one or more ends to the at least one non-molded portion via cement.

17. The method of claim 15, wherein securing the one or more ends includes stitching the one or more ends to the at least one non-molded portion.

18. The method of claim 17, where the one or more ends includes an indentation, wherein securing the one or more ends includes stitching the one or more ends with a stitching element such that the stitching element is received in the indentation.

19. The method of claim 15, where the at least one non-molded portion is a first portion of a footwear upper and the at least one molded portion is a second portion of the footwear upper, wherein securing at least one non-molded portion includes securing the first portion of the footwear upper to the last.

20. The method of claim 19, wherein curing the moldable material includes curing the moldable material to form the second portion of the footwear upper having one or more ends formed in the one or more end channels.

* * * * *